July 21, 1925.

Re. 16,123

L. SCHONWALD

LOCK PROTECTOR

Original Filed Sept. 9. 1920

Inventor:
Leopold Schonwald
By: Wm. O. Beck
Atty.

Reissued July 21, 1925. Re. 16,123

UNITED STATES PATENT OFFICE.

LEOPOLD SCHONWALD, OF NEW YORK, N. Y., ASSIGNOR TO PERRY S. BAUER, OF CHICAGO, ILLINOIS.

LOCK PROTECTOR.

Original No. 1,408,477, dated March 7, 1922, Serial No. 409,170, filed September 9, 1920. Application for reissue filed June 13, 1923. Serial No. 645,206.

*To all whom it may concern:*

Be it known that I, LEOPOLD SCHONWALD, a citizen of the United States, residing at the borough of Manhattan, in the county of New York, city and State of New York, have invented certain new and useful Improvements in Lock Protectors, of which the following is a specification.

The improvements relate to locks, and particularly to locks of the cylinder type, and their objects are, among others, to protect such locks against being broken or opened otherwise than by a proper key.

A lock of this type commonly comprises a barrel enclosing a key plug, and is provided with a face plate integral with the lock and having a suitable keyhole. This construction exposes the lock in such a manner that it may be broken by the use of a pipe wrench or other tool, the intruder using the tool to engage the face plate of the barrel and drawing it out and twisting it in such a manner as to break the connection which prevents rotation of the lock and thus turning the lock and opening the door or the like. The present improvements provide simple and effective means for preventing this.

The improvements are illustrated in the accompanying drawings, in which—

Figure 1:
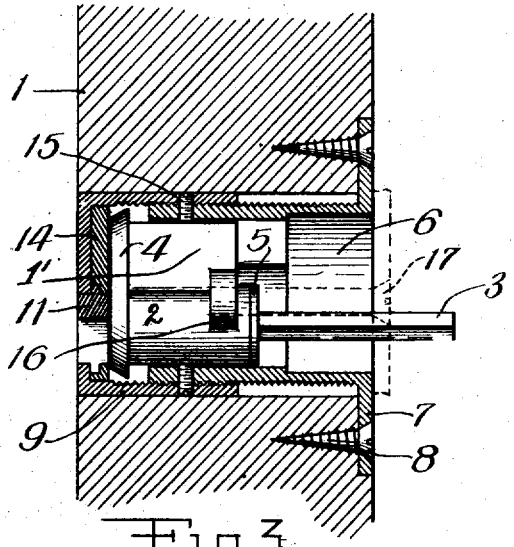
Fig. 1 is a vertical medial section of a lock protecting device with the parts of the lock enclosed therein indicated in full lines.
Figure 2:
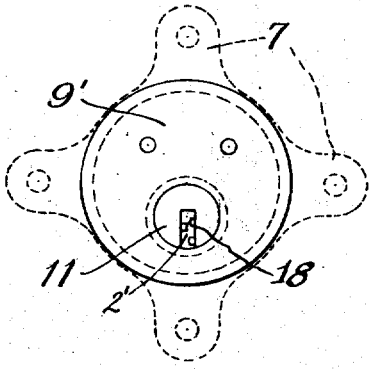
Fig. 2 is a view of the front or face of the lock with the protection.
Figure 5:
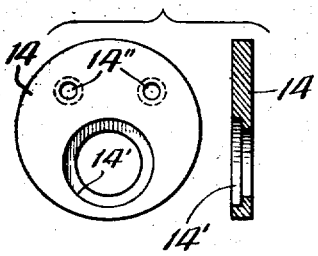
Fig. 5 is an inside view and vertical section of the plate for securing the keyhole protecting disk.
Figure 3:
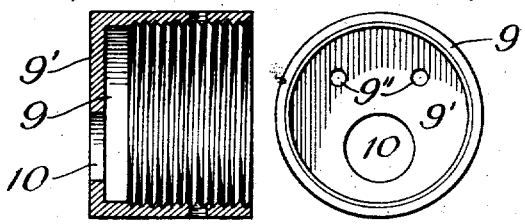
Fig. 3 is a detail of the protecting casing in vertical medial section and an inside view thereof.
Figure 6:
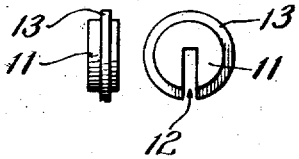
Fig. 6 is an edge and front view of the keyhole protecting disk.

For purposes of illustration I have shown my invention as applied to a door 1 (Fig. 1), which is apertured to receive a cylinder lock 1′. The cylinder lock comprises a barrel 2, in which is rotatably mounted the usual key plug 18 operatively connected to the lock spindle 3, which is adapted to operate a bolt or the like. The face of the lock consists of a face plate 4, preferably integral with the lock, access to the tumblers being provided through the removable plate 5 at the back of the barrel.

Figure 4:
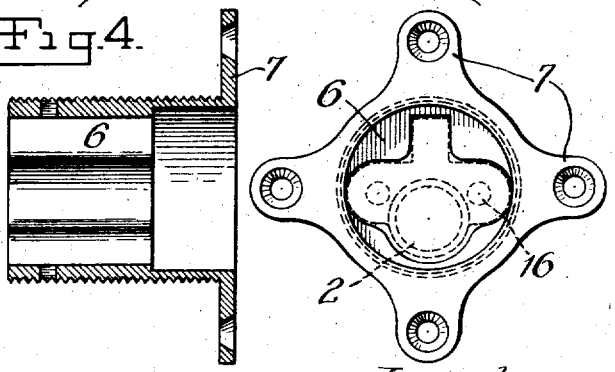
Fig. 4 shows similar views of a sleeve and its flanges which are secured to the inside of the door.

The means for securing the cylinder lock to the door comprises a sleeve 6 secured to the inner face of the door by flanges 7 receiving suitable screws or other fastenings 8, which enter the material of the door, and in this sleeve the cylinder lock fits snugly, the bore of the sleeve 6 being shaped to correspond with the shape of the said lock (see Fig. 4), so that it cannot be turned therein. The sleeve 6 is exteriorly threaded, and receives the casing 9, which is threaded interiorly, these two parts being adjustable lengthwise to accommodate different thicknesses of doors. When they have been adjusted to the thickness of the door one or more set screws 15 are passed through the opening in the casing 9, and an opening in the sleeve 6 made to align therewith and caused to press against the cylinder lock 1′ so as to hold all three parts securely in position. These set screws may be located on opposite sides, as shown.

The end 9′ of the protecting casing 9 is integral therewith, and the entire casing is made of hardened steel or the like so that it cannot be broken by tools, and as it encloses the face plate and barrel of the lock it will protect the lock securely. While I have referred to the protective casing as being made of hardened steel it will nevertheless be obvious that any other material may be substituted therefor, the gist of my invention residing in the provision of an armor for the lock.

In order to give access to the keyhole of the lock the end 9′ is provided with an opening 10 registering with the usual key plug 18 and which permits the key to be inserted therethrough and rotated. In the preferred form however a rotating disk 11 is mounted in this opening, registering with and protecting the key plug, and is provided with a key slot 12 through which the key may be inserted, into the keyway 2′, to operate the key plug or other means, which in turn operates lock spindle 3. The disk 11 is rotatably mounted in the opening by means of its annular rib or flange 13 which is confined between the back of the end 9′ adjacent to the opening and the grooved or stepped edge 14′ of the plate 14, the said plate being provided with an opening corresponding with the opening 10. Therefore it will be evident that the disk 11 will turn with the key and key plug or other means. The plate 14 is secured to the inner side of the end 9′ by means of screws or other fastenings passed through its openings 14″, which are in alignment with the openings 9″ of the said end. If desired, however, the disk 11 and plate 14 may be omitted and the face plate 4 placed against the inside of the end 9′ with the keyhole opposite the opening 10.

In order to make clear the objects and advantages of the improvements it should be explained that usually the lock is secured in position as by threaded lugs 16 engaged by bolts 17, and that it is a comparatively easy matter for one who wishes to break a lock of this character to engage the face plate 4 with a pair of heavy pliers, cutting away sufficient wood or other material of the door to give access thereto, and then to break the threaded lugs 16 or the screws 17 by turning the lock with the aid of the pair of heavy pliers and then to draw the lock out of the sleeve 6. With the protecting device of the present improvements, however, this cannot be done since the face and side surfaces of the lock are surrounded and protected by the hardened steel casing 9 and the rotatably mounted disk 11, it being understood that any attempt to break the lock or to operate it otherwise than by a proper key would be made from the outer side of the door.

While I have shown my invention embodied in a cylinder lock applied to a door, it is to be understood that I contemplate its use with other types of locks and with locks in other locations.

I am aware that changes in the form, construction and arrangement of parts may be made without departing from the spirit and without sacrificing the advantages of the invention and I reserve the right to make all such changes as fairly fall within the scope of the following claims.

I claim:

1. The combination with a cylinder lock adapted to be mounted in a door, of a protecting device comprising a sleeve surrounding the said lock and adapted to be secured to the inner side of a door and extending into the door and a casing having its outer end at the outer side of the door, extending inwardly therefrom and overlapping and secured to the sleeve in the interior of the door, said casing substantially closing the protecting device.

2. The combination with a cylinder lock adapted to be mounted in a door; of a protecting device comprising a sleeve surrounding the said lock and adapted to be secured to the inner side of a door and extending into the door and a casing having its outer end at the outer side of the door, extending inwardly therefrom and overlapping and secured to the sleeve in the interior of the door, said casing substantially closing the protecting device and having an opening in its end to permit the insertion of a key.

3. The combination with a cylinder lock adapted to be mounted in a door, of a protecting device comprising a sleeve surrounding the said lock and adapted to be secured to the inner side of a door and extending into the door and a casing having its outer end at the outer side of the door, extending inwardly therefrom and overlapping and secured to the sleeve in the interior of the door, said casing substantially closing the protecting device and having an opening in its end to permit the insertion of a key, and a disk provided with a key slot rotatably mounted in said opening.

4. The combination with a cylinder lock adapted to be mounted in a door, of a protecting device comprising a sleeve surrounding the said lock and adapted to be secured to the inner side of a door and extending into the door and a casing having its outer end at the outer side of the door, extending inwardly therefrom and overlapping and secured to the sleeve in the interior of the door, said cap substantially closing the protecting device and having an opening in its outer part to permit the insertion of a key, a disk provided with a key slot rotatably mounted in said opening, and a plate secured to the inside of said cap and confining a portion of said disk between itself and the end of the casing.

5. The combination with a cylinder lock adapted to be mounted in a door, of a protecting device comprising a sleeve surrounding the said lock and adapted to be secured to the inner side of a door and extending into the door and a casing having its outer end at the outer side of the door, extending inwardly therefrom and overlapping and secured to the sleeve in the interior of the door, said casing substantially closing the protecting device the overlapping portions of the said members having engaging threads and aligned openings, and a securing member passed through and secured in said openings and pressing against the lock.

6. The combination with a lock, of a protecting casing surrounding the lock on its face and side surfaces, said casing being made of hardened material to form an armor for the lock.

7. The combination with a lock, of a protecting casing of hard steel comprising a wall disposed around the lock and an end disposed over the face of the lock.

8. The combination with a lock, of a protecting casing for the lock, and a disk rotatably mounted in a casing adjacent the face of the lock.

9. The combination with a lock, of a protecting casing for the lock having an apertured end adjacent the face of the lock, and a disk rotatably mounted in the aperture.

10. The combination with a lock having a barrel for holding movable members of the lock, of a hard steel casing disposed around the barrel, and an apertured end integral with said casing disposed in front of the lock.

11. The combination with a lock having a barrel for holding movable members of the lock, of a hard steel casing for protecting the lock, the casing having an aperture registering with the keyhole of the lock, and a disk rotatably mounted in the aperture, the disk having a key receiving slot.

12. The combination with a lock comprising a plug having a keyway therein, of a disk having a key slot registering with the keyway of the plug, a casing, and means for rotatably mounting the disk in the casing adjacent the face of the lock, to protect said plug.

13. In combination, a lock provided with a face plate and a key plug, a protective casing having an end covering said face plate and having an aperture registering with said plug, and a disk closing said aperture and having a keyway, whereby a key may be inserted through said disk to operate the plug.

14. In combination, a lock provided with a face plate and a key plug, a protective casing having an end covering said face plate and having an aperture registering with said plug, and a disk closing said aperture and having a keyway, a plate between said end and face plate and provided with means to hold said disk in registry with said key plug, whereby a key may be inserted through said disk to operate the plug.

LEOPOLD SCHONWALD.